United States Patent [19]

Hubbard

[11] 4,026,980

[45] May 31, 1977

[54] PROCESS FOR PRODUCING MOULDED EXPANDED UREA FORMALDEHYDE PRODUCTS

[75] Inventor: Donald Arthur Hubbard, Cambridge, England

[73] Assignee: Imperial Chemical Industries Limited, London, England

[22] Filed: July 30, 1974

[21] Appl. No.: 493,150

[30] Foreign Application Priority Data

Aug. 6, 1973   United Kingdom ............. 37196/73

[52] U.S. Cl. .............................. 264/50; 260/2.5 F; 264/46.4; 264/53; 264/DIG. 2
[51] Int. Cl.$^2$ ......................................... B29D 27/04
[58] Field of Search ................. 264/50, DIG. 2, 53; 260/2.5 F

[56] References Cited

UNITED STATES PATENTS

| | | | |
|---|---|---|---|
| 2,789,095 | 4/1957 | Lindvig | 264/DIG. 2 |
| 3,256,067 | 6/1966 | Shriver et al. | 260/2.5 F X |
| 3,284,379 | 11/1966 | Brasco et al. | 260/2.5 F |
| 3,377,139 | 4/1968 | MacGregor et al. | 260/2.5 F |
| 3,535,273 | 10/1970 | Bauer | 264/DIG. 2 |
| 3,740,355 | 6/1973 | Klug | 260/2.5 F X |

*Primary Examiner*—Philip Anderson
*Attorney, Agent, or Firm*—Cushman, Darby & Cushman

[57] ABSTRACT

Expanded urea formaldehyde products are moulded from urea formaldehyde resin solution, a catalyst such as formic acid and, optionally, a foaming agent, casting the mixture in an open-topped mould, partially drying and curing the resulting gel at 20° C to 70° C to produce a preform, and subsequently heat-treating the preform above 120° C in a restraining mould and allowing it to expand therein.

10 Claims, No Drawings

PROCESS FOR PRODUCING MOULDED EXPANDED UREA FORMALDEHYDE PRODUCTS

The present invention relates to a process for moulding products containing resins based on urea formaldehyde (UF) condensation products in aqueous solution, with or without additions of melamine formaldehyde (MF) condensation products. These materials can be produced in the form of boards or other shapes having low specific gravity (0.2–0.8), good mechanical strength, satisfactory resistance to water and weathering and with far better fire resistance than, for example, expanded polyurethane foam sandwich materials. Panels produced by this process are of low cost and can be surfaced to make sandwich boards with synthetic resin skins, which may or may not be reinforced with fibres or fillers, or with wood veneers, metal sheets, paper skins, or other conventional facings.

It is well known that lightweight shapes of high resin content can be produced entirely from urea formaldehyde and other resin solutions by incorporating a catalyst which causes gelling and curing of the resin solution togeher with a foaming agent; the mixed solution is mechanically beaten in order to incorporate finely-divided air bubbles, which are stabilized by the foaming agent, and is allowed to cure in a mould or cavity. Such foamed shapes generally have very low mechanical strength and usually exhibit great shrinkage, deformation and cracking on curing, due to the loss of considerable quantities of water present in the mix and also that produced during the hardening reaction.

We have now found, however, that UF resin solutions (and mixtures thereof with MF resins) can be caused to produce hard stable panels or other shapes which do not crack or distort, by incorporating in the resin solution a catalyst which causes gelling and curing thereof, optionally also incorporating in the resin solution sufficient foaming agent to allow a moderate degree of foaming, casting the mixture, partially drying and curing the resulting gel to produce a preform, and heat-treating the preform, preferably at a temperature above about 120°, preferably above 140° C, in a restraining mould which allows expansion of the preform during the heat-treatment.

If a foaming agent is used, there may be only slight expansion of the preform in the restraining mould; on the other hand, if no foaming agent is used, the restraining mould may permit a greater degree of expansion of the preform during the heat treatment. (Furthermore, whereas it is preferred to produce a preform in a first stage and heat-treat it in the mould in a second stage, it is possible to combine these stages by partially curing the gel in the mould in the first instance, and thereafter, completely drying and curing it therein, under pressure.)

The present invention accordingly provides a process for producing moulded expanded UF products, which comprises the steps of incorporating in a UF resin solution (or a mixture thereof with MF resin) a catalyst which causes gelling and curing of the resin solution, optionally also incorporating in the resin solution a foaming agent, casting the mixture into an open top mould to gel, partially drying and curing the resulting gel to produce a preform, and subsequently heat-treating the preform at a temperature above about 120° C in a closable restraining mould and allowing expansion of the preform therein.

The dimensions of the mould may be such that the cold cured preform can be allowed to expand to some extent during the final heat treatment and so assume the full dimensions of the mould used. The degree of cold foaming may be varied between wide limits and also the amount of final expansion during the heat treatment process but we have found that panels having a final apparent specific gravity in the range 0.2–0.8 appear to have the best properties both from the viewpoint of mechanical strength as well as cost of manufacture.

The process can be exemplified as follows:

EXAMPLE 1

100 volumes of a standard UF liquid resin having a solids content of 69% is divided into two parts a. 20 Volumes
b. 80 Volumes The 20 volumes of resin solution are diluted with 20 volumes of water to which has been added an appropriate foaming agent such as Polawax GP200 (Croda Ltd.) or sodium alkyl sulphate or other suitable foam-producing substance, such as a soap or detergent, and the solution is then mechanically beaten at high speed until 50 to 150 volumes of air have been incorporated. The resultant stiff foam, in which the air-bubbles have been stabilized by the foaming agent, is then run through an homogeniser in order to remove gross bubbles and to produce a smooth cream containing the air in a very finely divided uniform condition. This is known as the "foam stock".

To the other 80 volumes of resin solution is added 10 volumes of a 10% wt/wt solution of commercial 85% formic acid and this mix is then immediately diluted with the already prepared foam stock taking care not to introduce gross air bubbles.

The resultant mixture is then poured into a flat open top mould (the "casting mould") to gel. This mould is preferably lined with paper to allow easy extraction of the gel at a later stage.

The gelled mixture thus has the following composition:

69% solids UF resin — 100 volumes
10% formic acid solution — 10 volumes
Water — 20 volumes (+ foaming agent)
Air (say) — 50 to 150 volumes The gel is allowed to cure (taking care to prevent any appreciable loss of water) until it is firm enough to be removed from the mould as a preform. This process will require 12 to 24 hours at ambient temperature, or can be completed in a few minutes at 50°/60° C, or can be speeded up by increasing the concentration of formic acid solution used.

If heating is used at this stage, the temperature should not be high enough in the early stages to cause any expansion of the gel.

After removal from the mould, the "cold-set" preform is placed in a closable flat mould, preferably having dimensions slightly greater than that of the initial "casting-mould". The mould containing the preform is then placed in a standard flat plate hot press with a platen temperature above about 120° C, say about 140° to 155° C and at a closing pressure of the order of about 50 to 300 psi to keep the mould shut. The top closing lid of the mould may be grooved on its underside to allow for the escape of any steam pressure built up.

During hot curing, which requires 10 to 30 minutes, depending on the thickness of the panel and the catalyst concentration, the preform will expand to assume the full dimensions of the second mould. After hot curing the panel may be stored flat under weights to allow complete stabilisation and drying.

The following points should be noted:

i. If large cavities are produced during the heat treatment stage, it will be because the preform has been insufficiently cold cured before the heat treatment stage.

ii. The standard liquid UF resin, used above is CIBA-GEIGY UK Ltd.'s Type Aerolite 300. A suitable formulation for the process is as follows:

FORMULATION I (a) Aerolite "300" : 20 volumes
    Water and foaming agent: 20 volumes
    } Foam in high speed mixer to incorporate at least 50 volumes of air.

(b) Aerolite 300 : 80 volumes
    8 to 12% Formic acid solution 10 volumes
    } Mix and add foam (a)

iii. Acid or acid-forming catalysts other than formic acid can be used.

iv. The cold set preform can advantageously be partially dried before the final heat expansion.

Satisfactory panels can also be made by omitting the foaming operation and allowing all the expansion to take place during the final heat-treatment of the preform in the mould. A suitable formulation for this embodiment of the invention is as follows:

FORMULATION II

Liquid UF resin (Aerolite 300): 100 volumes
8 to 12% Formic acid solution: 10 volumes Acid concentration is adjusted to give a gel time of about 15 minutes at 21° C. This is simply for ease of handling experimentally. Gel times can be safely reduced to 2 to 3 minutes at 21° C when continuous mixing and casting equipment is available.

UF RESIN CURING MECHANISM (GENERAL)

The conversion of liquid UF resins to a final infusible means is a two-stage process requiring the following conditions:

a. Gelation - which can be brought about by heating and/or acidification followed by:
b. Removal of water by evaporation.

The gel stage therefore can be reached by heating only, but is a lengthy process. Acidification however will cause gelling in the cold and the rate can be controlled within fine limits according to the degrees by which the pH is lowered.

The gel stage is an intermediate step in the curing cycle and although the product may be relatively hard, complete curing cannot be achieved until practically all the loosely-bound water in the gel has been removed by evaporation. As the water evaporates from the mass, cross-linking continues until the final infusible solid is produced.

If the acid gel produced from a liquid UF resin is heated in a closed mould so as to prevent the escape of water vapour the curing cannot be advanced appreciably even though the heating may be prolonged. Under these conditions the curing process is reversible and, for example, fully cured masses can be softened appreciably by treatment with steam under pressure. Very high pressure steam will indeed produce complete degradation to amines and other simpler compounds.

The choice of acid catalysts to be used also has a bearing on the curing mechanism. If a relatively non-volatile acid us used it is possible to produce exceptionally low pH's at the surfaces of the mass as water is lost from the gel stage and this results in a varying rate of cure from the surfaces to the interior. The tensions thus produced due to differential shrinkage cause fracture of the mass into minute particles.

Formic acid is chosen as the preferred catalyst because its vapour pressure is very close to that of water and there is thus less tendency for surface concentration.

If we consider the effects of the factors governing the curing cycle in relation to the production of UF board we arrive at the following conclusions:

A. Expanded Acid Gel Process (without use of a foaming agent).

The water content/pH balance should be controlled with some precision.

Commercial liquid UF resins are not normally produced at more than about 70% wt/wt solids content because high solids would in general produce unmanageable viscosities verging on the semi solid state.

If an acid gel is produced from a 70% liquid resin and is then expanded by heating above 100° C, the resulting board has a rather course pore structure and is still somewhat soft on removal from the mould. Complete hardening however will take place during the post cure conditioning step (loss of water). If on the other hand some of the water is removed from the acid gel before hot expansion the pore structure is very much finer and the expanded board will need very little post cure conditioning.

B. Foamed and Expanded Acid Gel Process (with use of a foaming agent).

This is of course a variant on process A, above. Before gelation takes place the liquid resin is prefoamed as described in Example 1. A superfine stable pore structure is important at this stage.

After gelation there is a somewhat greater quantity of water to be removed and some shrinkage will occur. It is possible at this stage to produce a final hard cured board with satisfactory mechanical properties, simply by allowing complete drying to take place at room temperature providing the boards are restrained in a flat condition. High speed, complete drying can of course be achieved by circulating hot air at a temperature of say 60°–70° C. On the other hand if this drying stage is arrested when the board still retains an appreciable moisture content (and is thus not fully cured) further expansion can be brought about by hot pressing, at say 150° C, for a short period of time during which the cell walls of the original foam structure will themselves expand under the influence of the residual water content.

EXAMPLE 2

10 parts by weight of a 10% formic acid solution were added to 100 parts of a liquid UF resin (Aerolite 300). This was cast into a mould 12mm. deep and left to gel. After 90 minutes, the mould was closed and placed in a heated press, at a temperature of 140° C. A pressure of 100 psi was placed on the mould in order to ensure its closure. After 30 minutes in the press, the mould was cooled to below 50° C, and the pressure then released. A stable, expanded material was removed from the mould. The density of the material was approximately $0.4 g.cm^{-3}$, and the average size of the bubbles in the expanded material was less than 1mm.

As a comparison, the resin, without formic acid, was placed, without prior treatment, into the mould, which was then immediately heated at 140° C for 30 minutes as described above. After cooling and opening, a foamed product was removed from the mould. The density was about $0.35 g.cm^{-3}$, but the material was friable, with a very coarse cell structure (bubble size > 2mm in many cases).

The same unmodified resin was charged to a mould and gelled by heating at 60° C for 180 minutes. This, after heating and cooling in a press as before, also gave an unsatisfactory product, with limited expansion and a very coarse cell structure.

EXAMPLE 3

5 parts by weight of a 10% formic acid solution were added to a liquid UF resin (Aerolite 300). The mixture was charged into two moulds, similar to those used in Example 2, one was left at 25° C for 20 minutes and the other was heated to 60° C for 20 minutes. Both samples gelled. The moulds were then closed and heated in a press, using the conditions of Example 2. On removal from the moulds, both samples had reasonably good cell structures (bubble size about 1mm). The density of the first sample was $0.44 g.cm^{-3}$, and that of the second sample was $0.40 g.cm^{-3}$.

EXAMPLE 4

A solution was prepared by mixing 100 parts of liquid UF resin, 20 parts of a spray-dried melamine formaldehyde resin (Melolam 285, from Ciba-Geigy Ltd) and 6 parts of a 10% formic acid solution. The mixture was charged to a mould and heated at 60° C for 20 minutes by which time gelation had occured; the mould was closed and heated in a press as in Example 2. A material was obtained which was of density $0.76 g.cm^{-3}$ with fine cell structure (bubble diameter < 0.5mm).

This procedure was repeated, except that spray-dried UF resin (Aerolite 306 from Ciba-Geigy Ltd) was used in place of the melamine resin powder. This again produced a fine structured foam material (bubble diameter generally < 0.5mm) of density $0.40 g.cm^{-3}$.

EXAMPLE 5

A UF resin/formic acid solution was prepared as in Example 3. This was charged to a mould (depth 12mm) and gelled by heating at 60° C for 20 minutes. The mould was closed and transferred to a press at 153° C. The mould was closed under a pressure of about 300 psi, and after 35 minutes the press and mould were cooled to below 50° C before opening the mould.

A sample with a reasonably fine cell structure (bubble size about 0.5mm) was obtained, density $0.62 g.cm^{-3}$. The higher density of the sample compared to those of Example 3 was obtained by the simple procedure of charging more resin to the mould.

EXAMPLE 6

The following components were mixed:

80 parts Aerolite 300
25 parts of Calcium sulphate hemi-hydrate (plaster of paris)
8 parts of a 20% formic acid solution The mixture was divided into two parts. The first part was charged to a 12mm mould to a depth of about 5mm. The second part was spread onto a sheet of 'Melinex' polyester sheet, to a depth of about 2mm.

Both were heated at 70° C for 10 minutes. The dried sheet resulting from the second part was cut up, and three layers charged to a mould, similar to that used for the first part. Both moulds were then heated to 140° C for 45 minutes, under a pressure of 50 psi. Both the samples obtained were of a fine cell structure (bubble diameter < 0.5mm) and of density 0.45 to $0.5 g.cm^{-3}$. In the laminated sample resulting from the second part, bonding between the laminations was excellent.

EXAMPLE 7

The following were mixed:

80 parts Aerolite 300
20 parts Aerolite 306
10 parts of a 20% formic acid solution The mixture was spread about 2mm thick on Melinex film, as described in Example 6 above, and heated at 70° C for 10 minutes. Three layers of the partially dried, gelled sheet were laminated and moulded using the procedure of Example 6. A sample of good cell structure (bubble diameter < 0.5mm) and of density $0.39 g.cm^{-3}$ was obtained.

Summary — UF Moulded Boards

Useful moulded products can be obtained from liquid UF resins by either of the two processes herein described:

Expanded Acid Gel Process — main stages

1. Add acid catalyst to resin solution
2. Cast flat gel
3. Partial drying (determines pore size)
4. Hot press expansion of preform
5. Final conditions/drying

Foamed and Expanded Acid Gel Process — main stages

1. Prepare foam stock (reduced volume of air)
2. Add acidified resin solution
3. Cast flat gel
4. Partial drying under restraint
5. Hot press expansion of preform (offsets shrinkage occurring during step 4)
6. Final conditioning/drying It is beyond the scope of this specification to give a detailed review of the voluminous literature dealing with catalysts for gelling and curing urea formaldehyde resins and with processes and agents for foaming them. Standard textbooks dealing with these subjects include:
1. "Encyclopaedia of Chemical Technology" by Kirk & Othmer, 1963, Vol. II, pages 225–258 (The Interscience Encyclopaedia Inc., New York)
2. "Amino Resins" by J. F. Blais, 1959 (Reinhold Book Division, New York) especially pages 11 to 14, 207
3. "Modern Plastics Encyclopaedia", 1967, pages 370–382 (McGraw-Hill Inc, New York)
4. "Amino plastics" by C. P. Vale, 1950 (Clearer-Hume Press Ltd., London)
5. "Amino plastics" by P. Talet, 1950 (Dunod, Paris)

I claim:
1. Process for producing moulded expanded urea formaldehyde products, which comprises the steps of: (a) incorporating in a urea formaldehyde resin solution a catalyst which causes gelling and curing of the resin solution, (b) depositing said mixture into an open top mould to partially fill said mould and permitting said mixture to gel, (c) partially drying and curing the resulting gel at a temperature between ambient temperature and about 70° C to produce a preform, and subsequently (d) closing the mould and heat-treating said preform at a temperature above about 120° C to further cure and expand said preform inside the closed mould.

2. Process as claimed in claim 1, wherein the urea formaldehyde resin solution also contains melamine formaldehyde resin.

3. Process as claimed in claim 1, which comprises the step of also incorporating a foaming agent in the resin solution and mechanically heating said solution to incorporate finely-divided air bubbles therein.

4. Process as claimed in claim 1, wherein the catalyst is formic acid.

5. Process as claimed in claim 1, wherein said heat treating of said preform is carried out at a temperature between about 140° and 155° C.

6. Process as claimed in claim 1, wherein pressure is applied to said dosed mould to ensure that it remains closed.

7. Process as claimed in claim 6, wherein the said pressure is between about 50 and 300 psi.

8. Process for producing moulded expanded urea formaldehyde products, which comprises the steps of (a) incorporating in a urea formaldehyde resin solution a catalyst which causes gelling and curing of the resin solution, (b) depositing said mixture into an open top mould and permitting said mixture to gel, (c) partially drying and curing the resulting gel at a temperature between ambient temperature and about 70° C to produce a preform, (d) transferring said preform into a second mould having dimensions at least slightly greater than said open top mould and (e) closing said second mould and heat-treating said preform at a temperature above about 120° C to further cure and expand said preform in said closed second mould.

9. Process as claimed in claim 8, wherein the heat treating of said preform is carried out at a temperature between about 140°, and 155° C.

10. Process as claimed in claim 8, which comprises the step of also incorporating a foaming agent in the resin solution and mechanically heating said solution to incorporate finely-divided air bubbles therein.

* * * * *